N. A. PALMGREN.
SEALING WASHER FOR ROLLER BEARINGS.
APPLICATION FILED OCT. 30, 1918.
1,332,271. Patented Mar. 2, 1920.
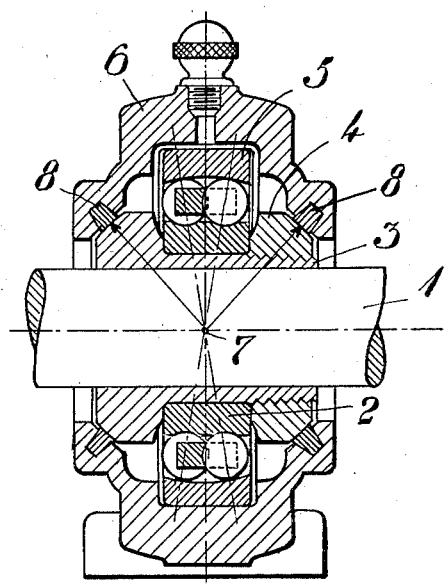
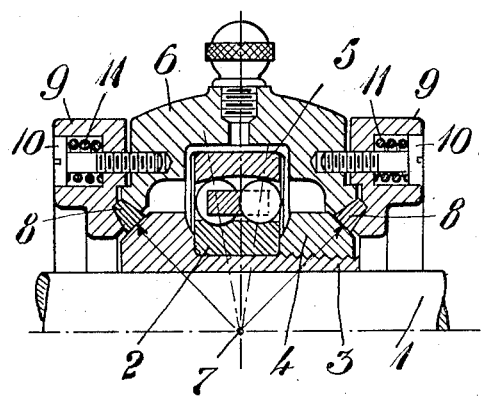
INVENTOR:
Nils Arvid Palmgren
By Att'ys

UNITED STATES PATENT OFFICE.

NILS ARVID PALMGREN, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

SEALING-WASHER FOR ROLLER-BEARINGS.

1,332,271.     Specification of Letters Patent.     Patented Mar. 2, 1920.

Application filed October 30, 1918. Serial No. 260,346.

*To all whom it may concern:*

Be it known that I, NILS ARVID PALMGREN, a subject of the King of Sweden, residing at Gottenborg, in the Kingdom of Sweden, have invented new and useful Improvements in Sealing-Washers for Roller-Bearings, of which the following is a specification.

This invention relates to sealing washers for roller bearings (including ball bearings), particularly self-adjusting bearings of this kind mounted in bearing casings and in which the inner bearing ring together with the shaft, owing to sag of the shaft or from other reasons, is caused to swing about a center of oscillation within the bearing.

The object of the invention is to provide, independently of said circumstances, an effective sealing device interposed between the bearing casing and the shaft or any member connected with the latter.

This object is attained by providing in the bearing casing one or more dirt or sealing washers bearing against a spherical surface formed on the shaft or on a sleeve or the like secured to the shaft and retaining the inner bearing ring thereon, the center of said spherical surface coinciding with the center of oscillation of the bearing.

Two embodiments of the invention are illustrated in the accompanying drawing in which—

Figure 1 is an axial section of a ball bearing mounted in a casing and provided with a sealing washer constructed according to the invention. Fig. 2 is an axial section of the upper half of a similar bearing equipped according to a further embodiment of the invention.

Referring to Fig. 1, 1 is a shaft journaled in a self-adjusting radial ball bearing having two rows of balls, the inner bearing ring 2 being rigidly secured to the shaft by means of a sleeve 3 and a nut 4 and the outer bearing ring 5 being mounted in the bearing casing 6. In the embodiment shown the sleeve 3 as well as the nut 4 is provided with a spherical surface concentric with the center of oscillation 7 of the bearing, and bearing against said spherical surfaces are dirt or sealing washers 8 preferably made of felt. Obviously, the contact between the washers 8 and the spherical surfaces of the sleeve and the nut is independent of the oscillations of the shaft 1 about the center 7.

The sealing device shown in Fig. 2 differs from that shown in Fig. 1 chiefly in that the washers 8 are pressed toward the spherical surfaces by means of spring devices. In the embodiment shown the washers are clamped between the bearing casing 6 and lateral covers 9 secured to the casing by means of screws 10. Placed between the bottoms of the screw holes in the said covers and the screw heads are spiral springs 11 tending to press the covers and the washers 8 toward the spherical tightening surfaces of the rotating members of the bearing. The view shows only the upper half of the bearing, the latter being symmetrical (as in Fig. 1), so that the lower half need not be shown.

In bearings for non-rotating shafts the washers may be connected with the bearing members secured to the shaft, while the casing in the places where sealing is to be effected is provided with spherical surfaces concentric with the center of oscillation of the bearing.

Having now particularly described and ascertained the nature of my said invention and in what manner the same is to be performed, I declare that what I claim is:

1. In a self-adjusting roller bearing mounted in a bearing casing, a sealing device, comprising means securing the inner bearing ring to the shaft, spherical surfaces formed on said securing means, and sealing washers secured to the bearing casing and bearing against said spherical surfaces.

2. In a self-adjusting roller bearing mounted in a bearing casing, a sealing device, comprising means securing the inner bearing ring to the shaft, spherical surfaces formed on said securing means and concentric with the center of oscillation of the bearing, and sealing washers secured to the bearing casing and bearing against said spherical surfaces.

3. In a self-adjusting roller bearing comprising outer and inner bearing rings and rolling members between, means for securing the inner bearing ring to the shaft, said means having spherical surfaces, the bearing casing affording a seat for the outer bearing ring, and annular members applied to opposite sides of the bearing casing, and sealing washers confined between the bearing casing and said annular members and bearing against said spherical surfaces.

In testimony whereof I have signed my name.

NILS ARVID PALMGREN.